(12) United States Patent
Egami et al.

(10) Patent No.: US 11,299,111 B2
(45) Date of Patent: Apr. 12, 2022

(54) CONNECTOR CONNECTING AND ANCHORING TWO WIRE HARNESSES

(71) Applicant: SUMITOMO WIRING SYSTEMS, LTD., Mie (JP)

(72) Inventors: Tomohiro Egami, Mie (JP); Yusuke Nakachi, Mie (JP); Takashi Furukawa, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 11 days.

(21) Appl. No.: 16/976,681

(22) PCT Filed: Feb. 22, 2019

(86) PCT No.: PCT/JP2019/006690
§ 371 (c)(1),
(2) Date: Aug. 28, 2020

(87) PCT Pub. No.: WO2019/171977
PCT Pub. Date: Sep. 12, 2019

(65) Prior Publication Data
US 2020/0406840 A1    Dec. 31, 2020

(30) Foreign Application Priority Data
Mar. 8, 2018  (JP) .............................. JP2018-041830

(51) Int. Cl.
*F16B 2/08*    (2006.01)
*H02G 3/30*    (2006.01)
*B60R 16/02*   (2006.01)

(52) U.S. Cl.
CPC ............ *B60R 16/0215* (2013.01); *F16B 2/08* (2013.01); *H02G 3/30* (2013.01)

(58) Field of Classification Search
CPC .......... B60R 16/0215; H02G 3/40; F16B 2/08
(Continued)

(56) References Cited

U.S. PATENT DOCUMENTS 3,250,505 A * 5/1966 Rodman, Sr. ........... F16L 3/233
                                                 248/74.3
5,538,208 A * 7/1996 Cordes .................... F16L 3/233
                                                 248/69
(Continued)

FOREIGN PATENT DOCUMENTS

JP   2015-061463    3/2015
JP   2016-201336   12/2016
(Continued)

OTHER PUBLICATIONS

Official Communication issued in International Bureau of WIPO Patent Application No. PCT/JP2019/006690, dated Apr. 16, 2019, along with an English translation thereof.

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

A connector for connecting and anchoring a base wire harness and an optional wire harness, the connector being provided with a first connector that includes a connected portion and is anchored to the base wire harness, and a second connector that is anchored to the optional wire harness and has a connecting portion that mounts on the connected portion. The connecting portion mounts on the connected portion from a direction that follows an outer surface of the base wire harness as viewed in a length direction of the base wire harness and engages with the connected portion in the length direction of the base wire harness.

3 Claims, 5 Drawing Sheets

(58) Field of Classification Search
USPC .......................................................... 174/72 A
See application file for complete search history.

(56) References Cited

U.S. PATENT DOCUMENTS

| | | | | |
|---|---|---|---|---|
| 6,186,451 | B1* | 2/2001 | Benoit | B60R 16/0215 |
| | | | | 248/74.3 |
| 6,364,257 | B1* | 4/2002 | Holder | F16L 3/237 |
| | | | | 248/74.1 |
| 7,762,503 | B2* | 7/2010 | Franks | F16L 3/2336 |
| | | | | 24/17 AP |
| 7,770,852 | B2* | 8/2010 | Caveney | H02G 3/32 |
| | | | | 411/401 |
| 8,579,239 | B2* | 11/2013 | Lothamer | B60R 16/0215 |
| | | | | 248/69 |
| 9,045,094 | B2* | 6/2015 | Schultz | H02G 3/00 |
| 9,067,717 | B2* | 6/2015 | DeMik | F16B 7/0433 |
| 10,096,934 | B1* | 10/2018 | Desjardins | H02G 3/32 |
| 2007/0007398 | A1* | 1/2007 | Franks | H02G 3/32 |
| | | | | 248/74.3 |
| 2014/0217246 | A1* | 8/2014 | Loewe | F16L 3/222 |
| | | | | 248/74.2 |
| 2017/0159849 | A1* | 6/2017 | Beyer | B65D 63/1027 |

FOREIGN PATENT DOCUMENTS

| | | |
|---|---|---|
| JP | 2016-205449 | 12/2016 |
| JP | 2017-163717 | 9/2017 |
| JP | 2017-192162 | 10/2017 |

* cited by examiner

CONNECTOR CONNECTING AND ANCHORING TWO WIRE HARNESSES

FIELD OF THE INVENTION

The present invention relates to a connector that connects wire harnesses.

BACKGROUND OF THE INVENTION

As regards wire harnesses routed in vehicles and the like, an add-on approach may be adopted that, depending on the vehicle grade or the like, provides additional optional wire harnesses to a base wire harness that represents a standard. In such a case, a method may be adopted in which an optional wire harness is indirectly anchored to a vehicle body by connecting and anchoring the optional wire harness to the base wire harness that is anchored to the vehicle body. In addition, the connection and anchoring of the optional wire harness to the base wire harness may be achieved by wrapping tape, for example, or providing the optional wire harness with a bundling tool having a gripping arm (see Patent Literature 1). A grouping of two gripping arms is mounted from a radially outer side of the base wire harness and is provided so as to hold the base wire harness between the arms. In addition, two groupings are provided in a length direction of the base wire harness and are mounted such that a band clip anchored to the base wire harness is interposed between the two groupings.

RELATED ART

Patent Literature

Patent Literature 1: Japanese Patent Laid-open Publication No. 2015-61463

SUMMARY OF THE INVENTION

Problems to be Solved by the Invention

However, with a configuration using a bundling tool such as noted above, although the configuration does not involve inconvenience such as the task of wrapping tape, there is a risk of relative displacement (offset) of the optional wire harness in the length direction of the base wire harness related to the clearance between the gripping arm and the band clip, the strength of a gripping arm that is required to bend, and so on. This may cause the optional wire harness to come into contact with other components, for example.

The present invention is conceived in light of the circumstances above and provides a connector that is capable of preventing relative displacement of a second wire harness in a length direction of a first wire harness.

Means for Solving the Problems

A connector that resolves the above-noted challenges is a connector for connecting and anchoring a first wire harness and a second wire harness, the connector being provided with a first connector that includes a connected portion and is anchored to the first wire harness, and a second connector that is anchored to the second wire harness and has a connecting portion that mounts on the connected portion. The connecting portion mounts on the connected portion from a direction that follows an outer surface of the first wire harness as viewed in a length direction of the first wire harness and engages with the connected portion in the length direction of the first wire harness.

According to this configuration, the connecting portion belonging to the second connector that is anchored to the second wire harness mounts on the connected portion belonging to the first connector that is anchored to the first wire harness, thereby connecting and anchoring the first wire harness and the second wire harness. In addition, the connecting portion mounts on the connected portion from a direction that follows the outer surface of the first wire harness as viewed in the length direction of the first wire harness, and engages with the connected portion in the length direction of the first wire harness. Therefore, relative displacement of the second wire harness in the length direction of the first wire harness is prevented.

In the connector noted above, preferably, a locking claw is provided that serves to prevent disengagement from a state where one of the connecting portion and the connected portion is engaged with and mounted on the other. According to this configuration, a locking claw is provided which serves to prevent disengagement from a state where one of the connecting portion and the connected portion is engaged with and mounted on the other. Therefore, relative displacement of the second wire harness in the direction that follows the outer surface of the first wire harness is prevented.

In the connector described above, preferably, the connecting portion includes a guide portion that guides the mounting of the connecting portion to the connected portion from a state where the positions of the members are offset in a direction orthogonal to the direction that follows the outer surface of the first wire harness as viewed in the length direction of the first wire harness.

According to this configuration, the connecting portion includes a guide portion that guides the mounting of the connecting portion to the connected portion from a state where the positions of the members are offset in a direction orthogonal to the direction that follows the outer surface of the first wire harness as viewed in the length direction of the first wire harness. Therefore, mounting work is facilitated.

In the connector described above, preferably, the guide portion includes a harness sliding guide that guides by sliding over the outer surface of the first wire harness. According to this configuration, the guide portion includes the harness sliding guide that guides by sliding over the outer surface of the first wire harness. Therefore, the harness sliding guide of the connecting portion provides guidance and enables mounting while sliding over the outer surface of the first wire harness, and mounting work is facilitated.

In the connector described above, preferably, the harness sliding guide is one of a pair of harness sliding guides provided at both ends of the connecting portion corresponding to the length direction of the first wire harness.

According to this configuration, the harness sliding guides are provided at both ends of the connecting portion corresponding to the length direction of the first wire harness. Therefore, the pair of harness sliding guides of the connecting portion provide stable guidance and enable mounting while sliding over the outer surface of the first wire harness, and mounting work is further facilitated.

Effect of the Invention

With the connector of the present invention, relative displacement of a second wire harness in a length direction of a first wire harness can be prevented.

MODE FOR CARRYING OUT THE INVENTION

Figure 1:
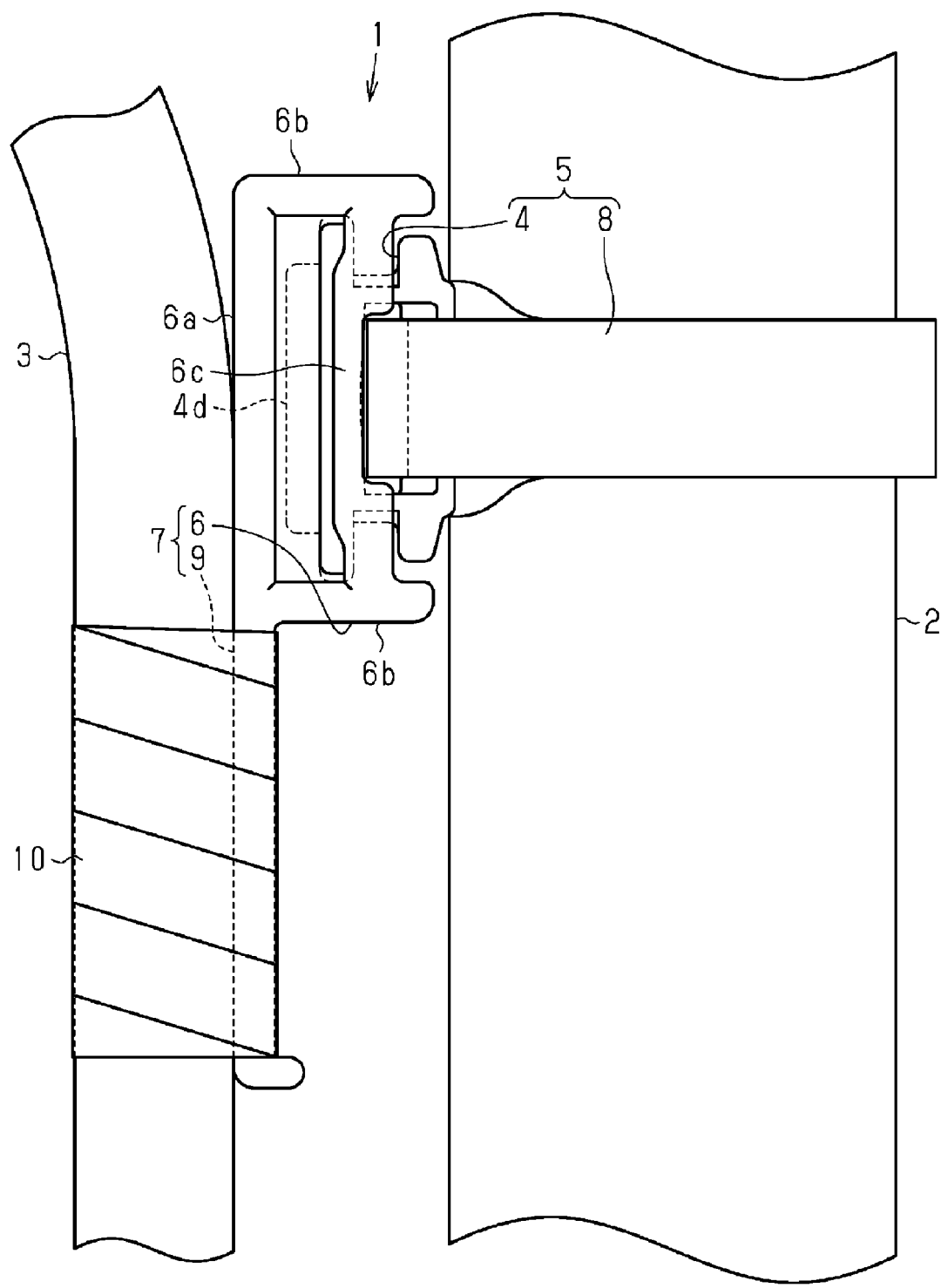
FIG. 1 is a plan view of a compound wire harness according to one embodiment.
Figure 2:
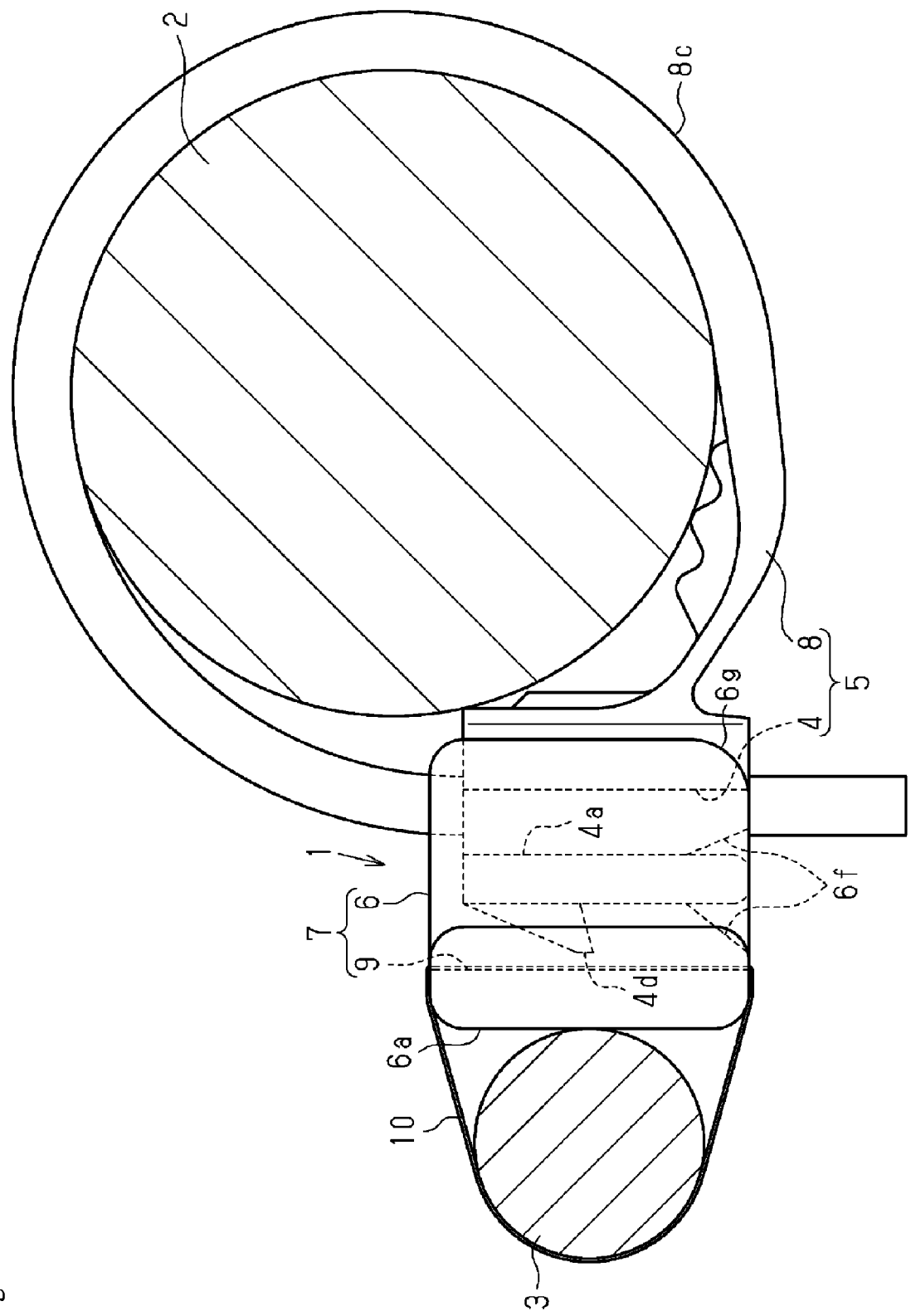
FIG. 2 is a partial cross-sectional view of the compound wire harness according to the embodiment.

Hereafter, one embodiment of a compound wire harness that is connected and anchored by a connector is described according to FIGS. 1 to 8. As illustrated in FIGS. 1 and 2, a connector 1 constructs a compound wire harness by connecting and anchoring an optional wire harness 3 that represents a second wire harness to a base wire harness 2 that represents a first wire harness that is routed in a vehicle. The base wire harness 2 and the optional wire harness 3 according to the present embodiment are formed in a substantially circular shape in cross-section, and the optional wire harness 3 is defined to have a smaller diameter than the base wire harness 2.

The connector 1 is provided with a first connector 5 that is anchored to the base wire harness 2 and includes a connected portion 4, and a second connector 7 that is anchored to the optional wire harness 3 and has a connecting portion 6 that mounts on the connected portion 4.

In addition, the connecting portion 6 is configured to be mounted on the connected portion 4 from a direction that follows an outer surface of the base wire harness 2 (a direction that follows a line tangential to the outer circumference of the base wire harness 2 in the present embodiment), as viewed in a length direction of the base wire harness 2 (see FIG. 2), and to engage with the connected portion 4 in the length direction (direction orthogonal to the plane of the drawing sheet in FIG. 2) of the base wire harness 2.

Figure 3:
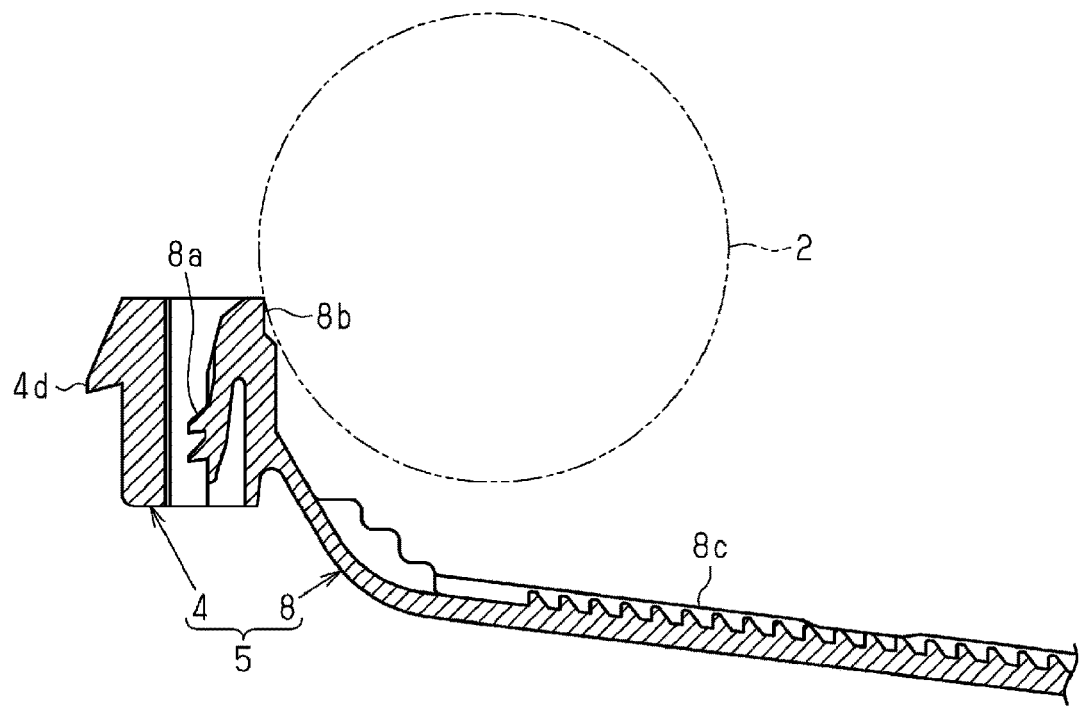
FIG. 3 is a partial cross-sectional view of a first connector according to the embodiment.
Figure 4:
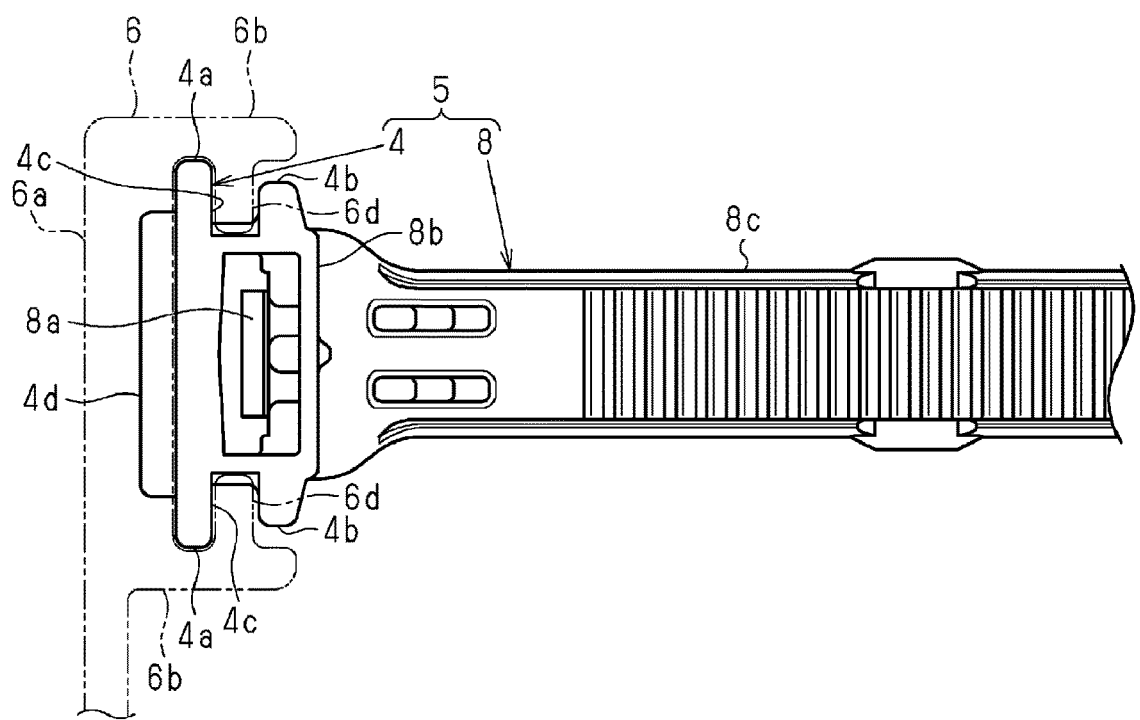
FIG. 4 is a plan view of the first connector according to the embodiment.

More particularly, as illustrated in FIGS. 3 and 4, the first connector 5 includes the connected portion 4 and a bundling band 8 that is anchored to the base wire harness 2. The bundling band 8 includes a substantially quadrangular tube-shaped band locking box 8b having a claw 8a on an inner surface thereof and a band 8c that extends from a back surface (right side surface in FIGS. 3 and 4) of the band locking box 8b. The band 8c is wrapped around the base wire harness 2 and the leading end of the band is inserted into the band locking box 8b and tightened in order to anchor the bundling band 8 to the base wire harness 2. The connected portion 4 includes front surface projections 4a that project to both sides (upper and lower sides in FIG. 4) from the front surface side of the band locking box 8b and back surface projections 4b that project to both sides from the back surface side of the band locking box 8b. The connected portion 4 includes mounting grooves 4c that are formed by the front surface projections 4a, the side surface of the band locking box 8b, and the back surface projections 4b. In addition, the connected portion 4 includes a locking claw 4d that projects from the front surface of the band locking box 8b.

Figure 5:
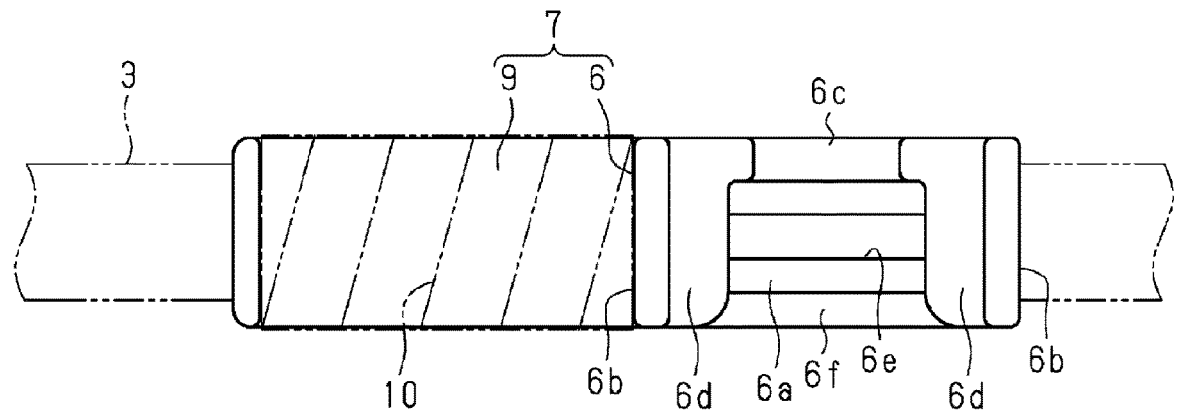
FIG. 5 is a front view of a second connector according to the embodiment.
Figure 6:
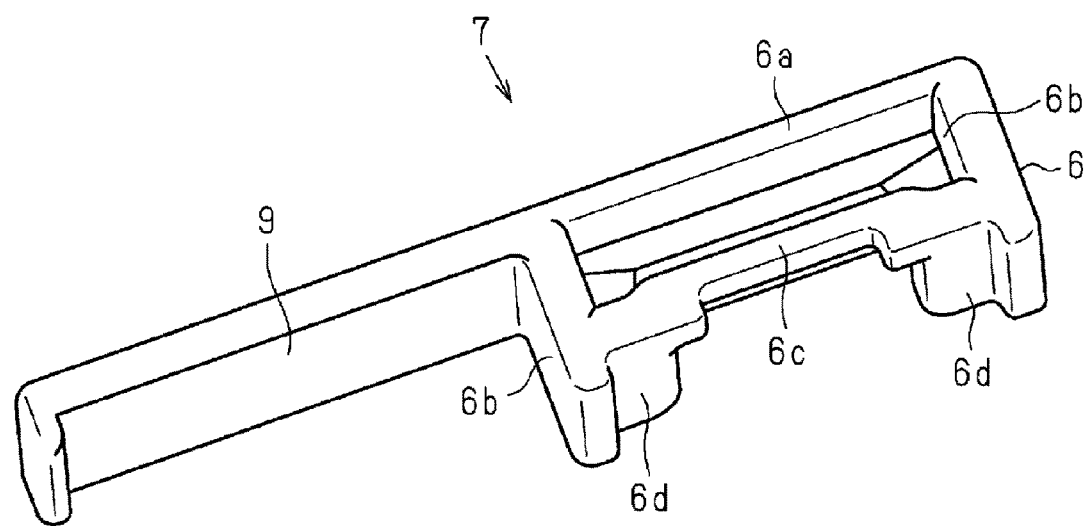
FIG. 6 is a perspective view of the second connector according to the embodiment.
Figure 7:
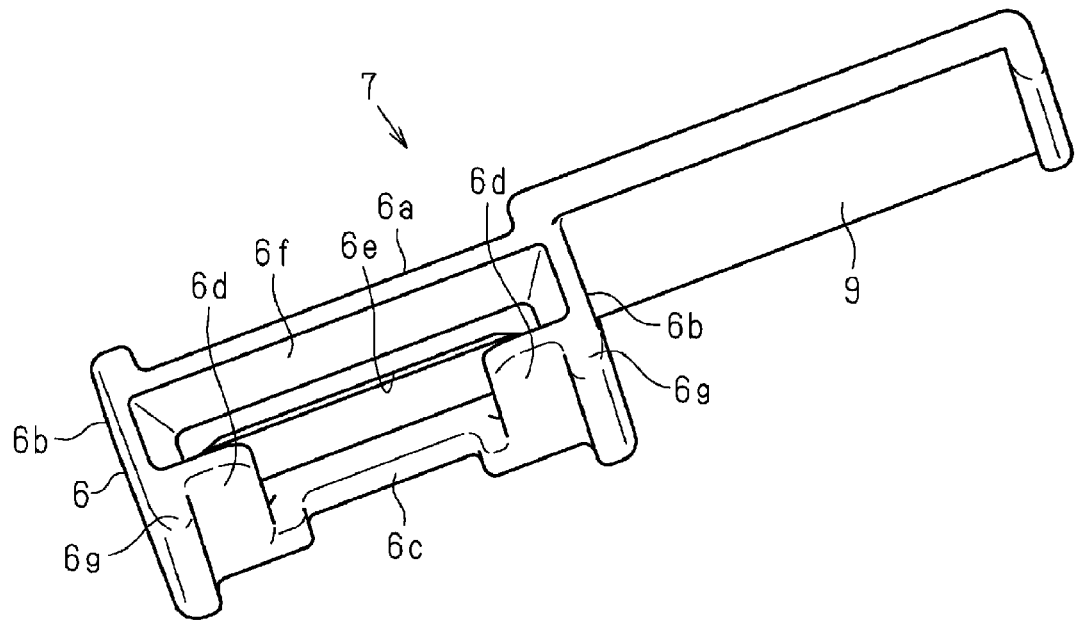
FIG. 7 is a perspective view of the second connector according to the embodiment.
Figure 8:
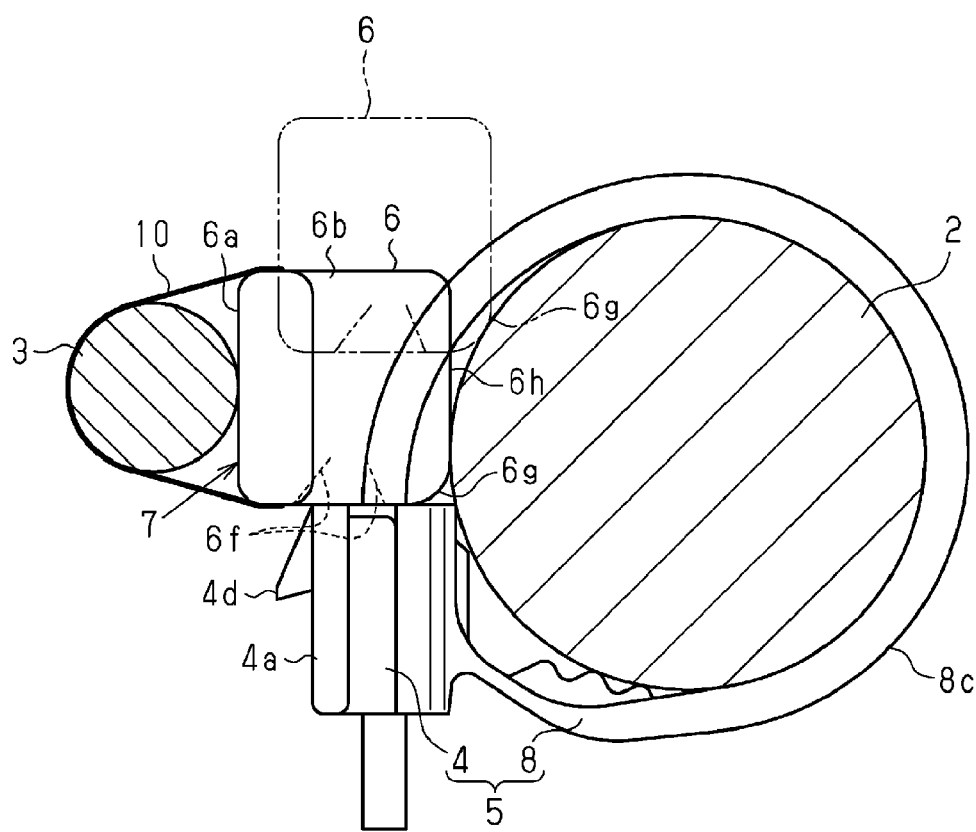
FIG. 8 is an explanatory diagram illustrating mounting of the connectors according to the embodiment.

In addition, as illustrated in FIGS. 5 to 7, the second connector 7 includes the connecting portion 6 and a harness anchoring portion 9 that is anchored to the optional wire harness 3. The harness anchoring portion 9 is formed in a plate shape and extends from a side surface (lower surface in FIG. 1) of the connecting portion 6 along one length direction of the optional wire harness 3 (downward in FIG. 1), and by wrapping a tape 10 around both the optional wire harness 3 and the harness anchoring portion 9, the harness anchoring portion 9 is anchored to the optional wire harness 3. The connecting portion 6 includes a base wall 6a that faces the front surface of the band locking box 8b of the first connector 5, a pair of opposing walls 6b that project from the base wall 6a and each face a side surface of the band locking box 8b, and a connecting wall 6c that connects the forefront end sides of the opposing walls 6b and faces a top surface (top surface in FIG. 3) of the band locking box 8b. Also, the connecting portion 6 includes a pair of extended mounting portions 6d that extend downward from both sides of the connecting wall 6c along the opposing walls 6b and respectively fit with the mounting grooves 4c. In addition, a claw fitting recess 6e (see FIG. 5) that fits with the locking claw 4d is formed on the base wall 6a of the connecting portion 6.

Also, the connecting portion 6 is mounted to the connected portion 4 from a direction that follows the outer surface of the base wire harness 2 (a direction that follows a line tangential to the outer circumference in the present embodiment) such that the extended mounting portions 6d fit with the mounting grooves 4c of the connected portion 4 and the front surface projections 4a are fitted between the base wall 6a and the extended mounting portions 6d (see FIG. 4). At this point, the connecting portion 6 is mounted such that the top surface of the band locking box 8b abuts the connecting wall 6c, and in this state the connecting portion 6 is prevented from disengaging from the connected portion 4 by the locking claw 4d engaging with the claw fitting recess 6e (in the opposite direction from the mounting direction). Also, in the connecting portion 6 in the mounted state, the opposing walls 6b and extended mounting portions 6d become engaged with the front surface projections 4a and mounting grooves 4c of the connected portion 4 in the length direction of the base wire harness 2 (vertical direction in FIG. 4).

Furthermore, the connecting portion 6 of the present embodiment includes opening guides 6f and harness sliding guides 6g serving as guide portions that guide the mounting of the connecting portion 6 onto the connected portion 4 from a state where the positions of the members are offset in a direction orthogonal to a direction that follows the outer surface of the base wire harness 2 (left/right direction in FIG. 8) as viewed in the length direction of the base wire harness 2. What is referred to here as "guiding" means that in a state where the position of the connecting portion 6 is offset in the orthogonal direction (left/right direction in FIG. 8), when the connecting portion 6 is displaced in a direction that follows the outer surface (the mounting direction; downward in FIG. 8), the orthogonal direction position is displaced to a position where mounting is possible. The opening guides 6f are formed on bottom end sides of the base wall 6a and the extended mounting portions 6d (bottom end side in FIG. 8), and are formed at an angle such that the space between the opening guides 6f grows larger toward the bottom end. In addition, the harness sliding guides 6g are formed at a bottom end of a protruding portion 6h that protrudes from the forefront end portions of the opposing walls 6b. The harness sliding guides 6g are formed curved such that the angle thereof forms an "R" shape. In other words, as illustrated by the two-dot-dashed line in FIG. 8, when the harness sliding guides 6g are displaced downward from a position abutting the base wire harness 2, the harness sliding guides 6g slide along the outer circumferential surface of the base wire harness 2 and guide the connecting portion 6 as shown by the solid line in FIG. 8 (leftward in FIG. 8). Furthermore, when the opening guides 6f are displaced downward from the arrangement shown by the solid line in FIG. 8, the opening guides 6f abut (slide over) the front surface projections 4a and guide the connecting portion 6 (to the left in FIG. 8) such that the front surface projections 4a fit in between the base wall 6a and the extended mounting portions 6d.

Next, the effects of the connector 1 configured as noted above are described. For example, when the optional wire harness 3 is provided in addition to the base wire harness 2 depending on the vehicle grade or the like, the connecting portion 6 of the second connector 7 that is anchored to the optional wire harness 3 is mounted to the connected portion 4 of the first connector 5 that is anchored to the base wire harness 2, thereby connecting and anchoring the base wire harness 2 and the optional wire harness 3. In doing this, when the base wire harness 2 is anchored to a vehicle body, for example, the optional wire harness 3 is also anchored to the vehicle body by way of the base wire harness 2.

Next, the benefits of the above-noted embodiment are described below.

(1) The connecting portion 6 belonging to the second connector 7 that is anchored to the optional wire harness 3 is mounted to the connected portion 4 belonging to the first connector 5 that is anchored to the base wire harness 2, thereby connecting and anchoring the base wire harness 2 and the optional wire harness 3. In addition, the connecting portion 6 is mounted to the connected portion 4 from a direction that follows the outer surface (a direction that follows a line tangential to the outer circumference) of the base wire harness 2, as viewed in the length direction of the base wire harness 2, and engages with the connected portion 4 in the length direction of the base wire harness 2. Therefore, relative displacement of the optional wire harness 3 in the length direction of the base wire harness 2 is prevented. As a result, the optional wire harness 3 is prevented from making contact or the like with other components due to shifting from a predefined position, for example.

(2) The connected portion 4 is provided with the locking claw 4d, which serves to prevent disengagement from a mounted state of engagement with the connecting portion 6. Therefore, relative displacement of the optional wire harness 3 in the direction that follows the outer surface of the base wire harness 2 is prevented.

(3) The connecting portion 6 includes the opening guides 6f and the harness sliding guides 6g serving as guide portions that guide the mounting of the connecting portion 6 onto the connected portion 4 from a state where the positions of the members are offset in a direction orthogonal to a direction that follows the outer surface of the base wire harness 2 (left/right direction in FIG. 8) as viewed in the length direction of the base wire harness 2. Therefore, mounting work is facilitated.

(4) The guide portions include the harness sliding guides 6g that guide by sliding over the outer surface of the base wire harness 2. Therefore, the harness sliding guides 6g of the connecting portion 6 provide guidance and enable mounting while sliding over the outer surface of the base wire harness 2, and mounting work is facilitated. In other words, as illustrated by the two-dot-dashed line in FIG. 8, even when mounting begins with the position of the connecting portion 6 greatly offset in the orthogonal direction (right direction in FIG. 8), mounting to the connected portion 4 can be accomplished easily by sliding the harness sliding guides 6g over the outer circumferential surface of the base wire harness 2.

(5) The harness sliding guides 6g are provided at both ends of the connecting portion 6 corresponding to the length direction of the base wire harness 2. That is, the harness sliding guides 6g are provided to each of the opposing walls 6b. Therefore, the pair of harness sliding guides 6g of the connecting portion 6 provide stable guidance and enable mounting while sliding over the outer surface of the base wire harness 2, and mounting work is further facilitated.

(6) The second connector 7 includes the harness anchoring portion 9 that extends from the connecting portion 6 along one length direction of the optional wire harness 3, and the second connector 7 is anchored to the optional wire harness 3 by the harness anchoring portion 9 alone. Therefore, the other direction side of the length direction of the optional wire harness 3 can be bent at the position corresponding to the connecting portion 6 (see FIG. 1).

The embodiment described above can also be modified as follows.

In the embodiment described above, the connected portion 4 is configured to include the locking claw 4d that serves to prevent disengagement from a mounted state of engagement with the connecting portion 6. However, a locking claw that serves a similar purpose may be provided to the connecting portion 6 side, or the mounted state may be preserved by some other configuration such as press fitting without providing a locking claw.

In the embodiment described above, the connecting portion 6 includes guide portions (the opening guides 6f and the harness sliding guides 6g) that guide the mounting of the connecting portion 6 to the connected portion 4 from a state where the positions of the members are offset in a direction orthogonal to a direction that follows the outer surface of the base wire harness 2 (left/right direction in FIG. 8) as viewed in the length direction of the base wire harness 2. However, a configuration is also possible that does not include guide portions. In addition, a configuration that includes only one of either the opening guides 6f and the harness sliding guides 6g as guide portions may be adopted, or a configuration having some other guide portion serving a similar purpose may be adopted.

In the embodiment described above, the second connector 7 includes the harness anchoring portion 9 that extends from the connecting portion 6 along one length direction of the optional wire harness 3, and the second connector 7 is anchored to the optional wire harness 3 by the harness anchoring portion 9 alone. However, the present invention is not limited to this and the second connector 7 may be anchored to the optional wire harness 3 with some other configuration. For example, the second connector 7 may further include a harness anchoring portion that extends from the connecting portion 6 along the other length direction of the optional wire harness 3, and may be anchored to the optional wire harness 3 by both harness anchoring portions. In addition, the first connector 5 may also be anchored to the base wire harness 2 with a configuration other than the bundling band 8.

In the embodiment described above, the base wire harness 2 and the optional wire harness 3 are formed in a substantially circular shape in cross-section. However, the present invention is not limited to this and a base wire harness or optional wire harness having a cross-section that is not circular may also be implemented.

The technical ideas that can be understood from the above-described embodiment are noted below.

(a) The second connector is a connector that includes the harness anchoring portion extending from the connecting portion along one length direction of the second wire harness, and is anchored to the second wire harness by the harness anchoring portion alone.

With a similar configuration, the second connector includes the harness anchoring portion that extends from the connecting portion along one length direction of the second wire harness, and the second connector is anchored to the second wire harness by the harness anchoring portion alone. Therefore, the other direction side in the length direction of the second wire harness can be bent at the position corresponding to the connecting portion.

One of ordinary skill in the art will clearly understand that the present invention may be achieved by other distinct embodiments within a scope that does not deviate from these technical ideas. For example, one of the components described in the embodiment (or one or several aspects thereof) may be omitted, or several components may be combined. The scope of the present invention is to be determined with reference to the attached claims together with the full range of equivalent embodiments to which the rights granted by the claims may extend.

DESCRIPTION OF REFERENCE NUMERALS

1 . . . Connector
2 . . . Base wire harness (first wire harness)
3 . . . Optional wire harness (second wire harness)
4 . . . Connected portion
4d . . . Locking claw
5 . . . First connector
6 . . . Connecting portion
6f . . . Opening guide (guide portion)
6g . . . Harness sliding guide (guide portion)
7 . . . Second connector

The invention claimed is:

1. A connector for connecting and anchoring a first wire harness and a second wire harness, the connector comprising:
   a first connector that includes a connected portion and is anchored to the first wire harness; and
   a second connector that is anchored to the second wire harness and has a connecting portion that mounts on the connected portion,
   wherein the connecting portion mounts on the connected portion from a direction that follows an outer surface of the first wire harness as viewed in a length direction of the first wire harness and engages with the connected portion in the length direction of the first wire harness,
   the connecting portion includes a harness sliding guide that guides the mounting of the connecting portion on the connected portion from a first position to a second position, the first position being a position where the connecting portion does not contact and is offset from the connected portion in a direction orthogonal to the direction that follows the outer surface of the first wire harness as viewed in the length direction of the first wire harness, the second position being a position where the first connecting portion contacts the connected portion, and
   the harness sliding guide is configured to contact and slide along the outer surface of the first wire harness from the first position to the second position to guide the mounting of the connecting portion on the connected portion.

2. The connector according to claim 1, wherein a locking claw is provided that prevents disengagement from a condition in which one of the connecting portion and the connected portion is engaged with and mounted on the other.

3. The connector according to claim 1, wherein the harness sliding guide is one of a pair of harness sliding guides provided at both ends of the connecting portion corresponding to the length direction of the first wire harness.

* * * * *